United States Patent [19]

Nodurft

[11] 3,737,719

[45] June 5, 1973

[54] LIGHTING SYSTEM WITH AUXILIARY LAMP CONTROL CIRCUIT AND PROTECTIVE MEANS THEREFOR

[75] Inventor: Clair A. Nodurft, East Flat Rock, N.C.

[73] Assignee: General Electric Company, Pittsfield, Mass.

[22] Filed: Aug. 2, 1971

[21] Appl. No.: 167,977

[52] U.S. Cl. ..................................315/91, 315/92
[51] Int. Cl. ..............................................H05b 39/10
[58] Field of Search.....................315/88, 90, 91, 92; 317/151

[56] References Cited

UNITED STATES PATENTS

| 3,517,254 | 6/1970 | McNamara | 315/92 X |
| 3,466,507 | 9/1969 | Ragen | 317/148.5 |
| 3,407,334 | 10/1968 | Attewell | 315/278 |
| 3,599,036 | 8/1971 | Haymaker | 315/92 X |
| 3,611,432 | 10/1971 | Babcock et al. | 315/92 |

*Primary Examiner*—Roy Lake
*Assistant Examiner*—James B. Mullins
*Attorney*—Sidney Greenberg, J. Wesley Haubner, Frank L. Neuhauser et al.

[57] ABSTRACT

Electrical ballast circuit for operating a gaseous discharge lamp is combined with an incandescent lamp circuit having relay control means for automatically turning the incandescent lamp on when the discharge lamp goes off. The arrangement provides for the auxiliary incandescent lamp to remain on until the discharge lamp is re-started and reaches substantially normal illumination level, after which the incandescent lamp is automatically turned off. The control circuit is particularly adapted for use with gaseous discharge lamps requiring high voltage pulses for ignition and incorporates capacitors for protecting the relay control means from such high voltage pulses.

3 Claims, 1 Drawing Figure

PATENTED JUN 5 1973 3,737,719
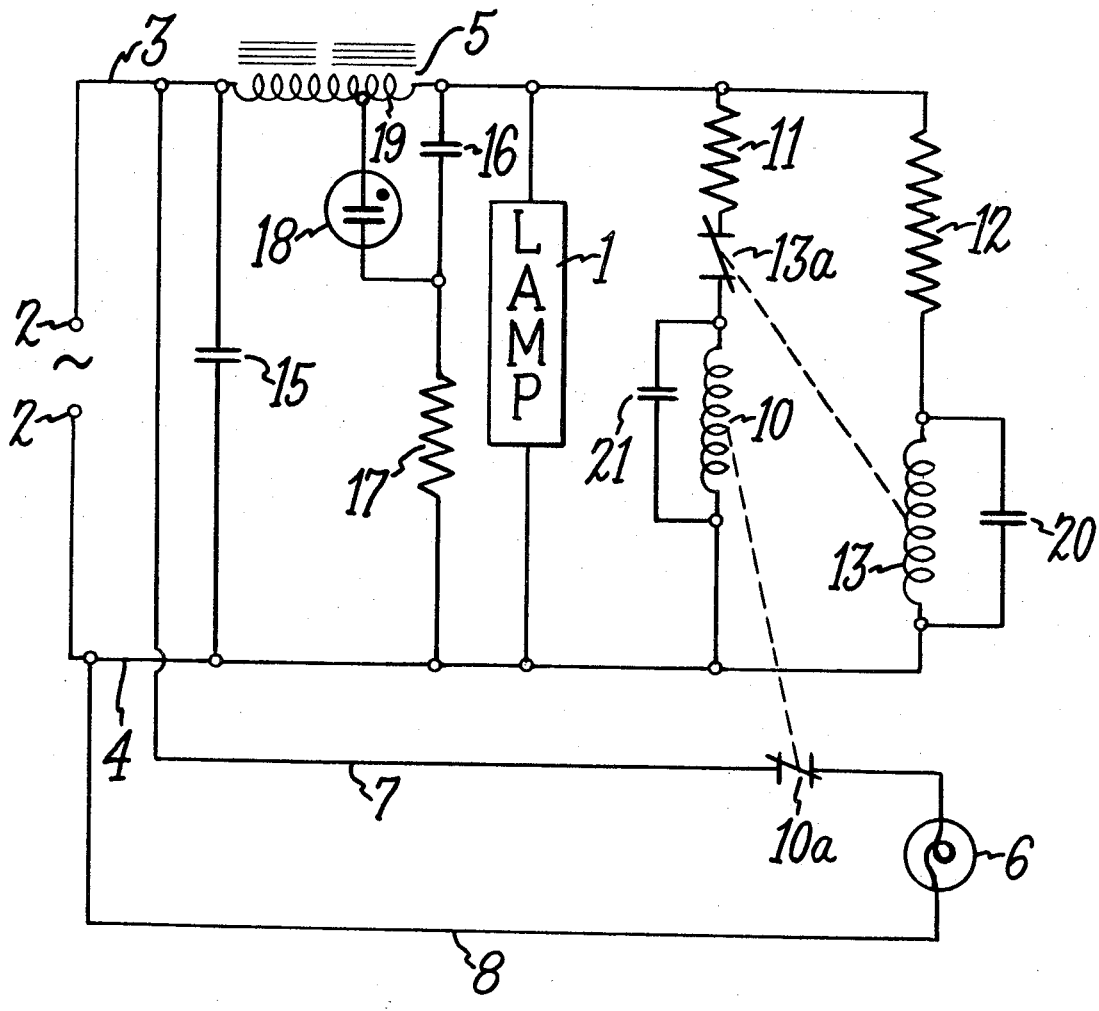
Inventor,
Clair H. Nodurft,
by Sidney Greenberg
His Attorney.

LIGHTING SYSTEM WITH AUXILIARY LAMP CONTROL CIRCUIT AND PROTECTIVE MEANS THEREFOR

This invention is an improvement on the lighting system disclosed in co-pending application of Willis Ser. No. 167,978, filed Aug. 2, 1971 and assigned to the same assignee as the present invention. In the Willis application, the disclosure of which is incorporated herein by reference, there is disclosed a lighting system for gaseous discharge lamps of various types wherein an auxiliary lamp and a control circuit therefor are provided for turning the auxiliary lamp on during the periods when the main gaseous discharge lamp is not operating and when it is being started but has not reached its full illumination level, and for automatically turning the auxiliary lamp off when the gaseous discharge lamp is in normal operation. Incorporated in the control circuit, as more fully described hereinafter, are electrical relays for providing the above-described functions. When such a lighting system employs a gaseous discharge lamp which requires very high voltage pulses, e.g., in the kilovolt range, for igniting the lamp, the relays are likely to be damaged when subjected to such high voltages, and it is this problem that the present invention is designed to overcome.

It is accordingly an object of the present invention to provide a combined operating circuit for a gaseous discharge lamp and an incandescent lamp whereby the incandescent lamp is automatically turned on when the gaseous discharge lamp is extinguished, and particularly to provide such a circuit for gaseous discharge lamps requiring a high voltage in order to be ignited.

It is another object of the invention to provide a circuit of the above description whereby the incandescent lamp is maintained in operation until the gaseous discharge lamp is re-started and reaches normal operating condition, after which the incandescent lamp is automatically turned off.

A particular object of the invention is the provision, in combination with an operating circuit having a high voltage lamp starting means, of a control circuit of the above description for use with gaseous discharge lamps requiring a high ignition voltage, wherein relays employed in the control circuit are protected from the high voltage ignition pulses.

Still another object of the invention is the provision of a lighting system of the above description wherein the high voltage ignition pulses necessary for igniting the gaseous discharge lamp are not adversely affected by the protected control circuit.

Other objects and advantages will become apparent from the following description and the appended claims.

With the above objects in view, the present invention in one of its aspects relates to a lighting system comprising, in combination, voltage supply means, electrical ballast means connected to the voltage supply means, a gaseous discharge lamp connected to the ballast means for energization by the voltage supply means, the gaseous discharge lamp having a low voltage during its starting period, an intermediate voltage during its normal operation period, and a high voltage during its non-operating period, the gaseous discharge lamp being of high breakdown-potential type requiring an ignition voltage substantially higher than said high voltage, ignition means electrically connected to the gaseous discharge lamp for producing short duration pulses of such ignition voltage thereon, an auxiliary lamp serving as a stand-by lamp for the gaseous discharge lamp, means for connecting the auxiliary lamp to a source of electrical current, control means selectively responsive to said low, intermediate, and high voltages for turning on the auxiliary lamp during said high voltage non-operating and low voltage starting periods of the gaseous discharge lamp and for turning off the auxiliary lamp during the intermediate voltage normal operation period of the gaseous discharge lamp, and protective means connected to the control means for protecting the same against the ignition voltage pulses produced by the ignition means.

The invention will be better understood from the following description taken in conjunction with the accompanying drawing, in which:

The single FIGURE is a circuit diagram of a lighting system embodying the present invention.

Referring now to the drawing, there is shown a starting and operating circuit for gaseous discharge lamp 1 connected by means of line conductors 3 and 4 to terminals 2 of a source of alternating current, typically 240 volts. Connected in supply line 3 in series with discharge lamp 1 is an inductive reactance 5 in the form of an iron core induction coil which serves as an electrical ballast to provide a maximum current in the discharge lamp circuit and limits the amount of current that can be drawn by lamp 1, as conventional in the art. Lamp 1 is typically a gaseous discharge lamp of high pressure, high intensity type. Its nature is such that upon being extinguished due to interruption of supply current or a drop in voltage across the line, or other causes, it will not re-ignite until it has cooled off, even after normal supply current has been restored. As a result, the light from one or more luminaires using such gaseous discharge lamps and operated from the same electrical supply system may suddenly fail due to a transient fault in the system, and darkness would prevail for the several minutes necessary to allow the discharge lamps to cool sufficiently to permit re-ignition.

In accordance with the invention described and claimed in the aforementioned Willis application, this difficulty is overcome by providing an auxiliary lighting circuit and control circuit therefor in combination with the described main lighting circuit, by means of which an auxiliary or stand-by lamp, such as an incandescent lamp, will automatically be turned on when the gaseous discharge lamp goes out, will remain on during the interval for re-starting the discharge lamp and will automatically be turned off after the discharge lamp resumes normal operation at full illumination.

Certain types of gaseous discharge lamps, for example, high pressure sodium vapor lamps such as are commercially available under the trademark Lucalox, require a much higher voltage for ignition than the operating or source voltage. As used herein, "ignition voltage" means a voltage (which is substantially higher than the operating or source voltage) required to initially breakdown the gap between the lamp electrodes so as to ignite the lamp, and "starting voltage" means the voltage (which is much lower than the ignition voltage) required for ionizing the contained gas after the initial gap breakdown. Lamps which require such high ignition voltages are referred to herein as "high breakdown-potential discharge lamps."

In the case of a typical 400 watt high breakdown-potential discharge lamp, the ignition voltage required is 2,500 volts peak minimum, 4,000 volts peak maximum, with a minimum width of 1 micro-second at 90 percent of the peak value; the starting voltage thereafter in the initial lamp ionization stage is about 20 volts; the operating voltage is about 100 volts; and the voltage across the lamp during its non-operating period is about 200 volts.

Various known circuit arrangements can be employed in the main lamp operating circuit for providing the necessary initial high voltage ignition pulses. A suitable arrangement, shown in the drawing, for producing such high voltage ignition pulses, e.g., of 2 or 3 kilovolts, on discharge lamp 1 comprises a high voltage pulse generator including capacitor 16 and resistor 17 connected in series across discharge lamp 1 on the output side of reactor 5, and a voltage sensitive symmetrical switch 18, such as a neon glow lamp, which is a bilaterally conducting gas tube and which becomes conductive only upon the application of a predetermined voltage thereon. Other types of voltage sensitive bilaterally conducting switch devices may be used instead of a neon glow lamp, as for example, oppositely poled parallel connected controlled rectifiers, Shockley diodes, triacs (alternating current semiconductor switch with single control electrode) or other equivalent switch devices or circuits. As shown, glow lamp 18 is connected across capacitor 16 and a predetermined number of turns 19 of reactor ballast 5 at the output end thereof, so that glow lamp 18 is in series discharge relation with capacitor 16 and the tapped turns 19 of ballast 5 in series therewith. In a typical arrangement, the ratio of total turns of reactor 5 to tapped turns selected is about 12 to 1, which usually suffices to provide good coupling and adequate peak voltage for igniting discharge lamp 1.

Connected across terminals 2 at the input side of reactor ballast 5 is capacitor 15 which serves both as a high frequency by-pass and power factor improvement capacitor.

In the operation of the described pulse generator circuit, capacitor 16 is initially charged through resistor 17 by the input voltage from the alternating current source. As the voltage across capacitor 16 rises, it reaches the breakdown potential of neon glow lamp 18. When this occurs, capacitor 16 discharges through tapped turns 19 placing, say, 275 volts across those turns, resulting in a step-up by reactor 5 acting as a pulse transformer to a voltage of, say, about 3,000 volts which appears across the total reactor turns. Pulses of this high voltage level are thereby produced across lamp 1 by the pulse generating circuit described. The line side of reactor 5 is shorted at the pulse frequency by capacitor 15. Since the pulse voltage cannot rise across capacitor 15, it must rise across resistor 17. Hence, the pulse voltage appears across discharge lamp 1 in the correct polarity on each half cycle until lamp 1 starts. Upon starting of lamp 1, the pulsing mechanism is disabled as a result of the voltage clamping action of the ignited lamp load and therefore the voltage buildup across capacitor 16 does not reach the breakdown level of neon lamp 18.

Ignition circuits of the above-described type are disclosed in the co-pending application of Nuckolls Ser. No. 674,508 filed Oct. 11, 1967 and assigned to the same assignee as the present invention. The description therein is accordingly incorporated by reference herein. Similar circuit arrangements for producing high voltage ignition pulses are shown in the U.S. Pat. to Attewell, No. 3,407,334. Other forms of high voltage ignition circuits which may be employed, if desired, for igniting the discharge lamp are disclosed, for example, in Nuckolls U.S. Pat. No. 3,344,310, Nuckolls U.S. Pat. No. 3,328,673 and Wattenbach U.S. Pat. No. 3,235,769.

It will be further understood that while only one form of ballast is shown in the drawing, various other ballasts of known or suitable type may be employed instead of the reactor ballast here illustrated. For example, ballasts of lag, lead, regulator, autotransformer, or isolation transformer type may be used as appropriate for particular circumstances, as well understood in the art, and as variously disclosed in the aforementioned prior art and Willis application.

As shown in the FIGURE, an incandescent lamp 6 is connected by means of conductors 7, 8 across the electrical supply terminals 2 in the main lighting circuit. Connected across discharge lamp 1 is a coil 10 of a relay having normally closed switch contacts 10a connected in series with auxiliary lamp 6 in the latter circuit. Connected in series with relay coil 10 is a resistance 11. In another branch parallel to relay coil 10 and resistance 11 is a resistance 12 in series with relay coil 13 which has normally closed switch contacts 13a arranged in series with relay coil 10. In a usual case, both relays 10 and 13 may be of the same rating, while resistance 11 is selected to be of substantially lower value than resistance 12. For example, in a typical case, where a voltage supply of about 240 volts is used, resistance 11 would be about 2,200 ohms and resistance 12 would be about 18,000 ohms, and both relays would open at about 70 volts across their respective coils at a current of 7 milliamperes.

While the auxiliary incandescent lamp 6 is shown connected to the supply source for the main lighting circuit, it will be understood that it may alternatively be connected to a separate alternating current electrical supply or to a direct current source such as a battery, if desired.

When relays of ordinary type are used as described, there is a risk that the high voltage ignition pulses produced by the described high voltage discharge circuit and which appear across relay coil 13 during the lamp ignition period will cause failure of the coil and thereby prevent proper operation of the auxiliary lighting circuit as intended. In accordance with the present invention, this difficulty is avoided, as shown in the illustrated embodiment, by connecting a by-pass capacitor 20 in shunt with relay coil 13, by means of which the high voltage ignition pulses are by-passed around the coil. Capacitor 20, which in a typical case will be a 0.005 microfarad 1,000 volt capacitor, thereby presents a low impedance to the short duration, high voltage ignition pulses as compared to coil 13 and thus limits the voltage impressed across the coil. During this ignition period, relay coil 13 is energized and opens relay contacts 13a. As a result, the open contacts 13a present an infinite impedance in series with relay coil 10 and resistance 11, and consequently the high voltage pulses applied to lamp 1 are not attenuated. Moreover, the relatively high impedance presented by resistance 12 in series with relay coil 13 also is sufficient to avoid appreciable attenuation of the ignition pulses.

Although relay contacts 13a when open may serve to prevent the high voltage pulses from being applied to relay coil 10 in series therewith, it is usually desirable also to provide another by-pass capacitor 21 similar to capacitor 20 across relay coil 10. This will protect the latter from the ignition pulses which may pass through relay contacts 13a at the beginning of the ignition stage when these contacts have not yet fully opened, and also in the event the high voltage pulses jump the gap of the open relay contacts 13a during the ignition period.

In the operation of the circuit thus described, after discharge lamp 1 is ignited by the pulse generator circuit as previously explained, a relatively low voltage then appears across lamp 1 and the parallel connected relay coils 10 and 13. This voltage is too low to actuate the normally closed switch contacts 10a and 13a, and as a result auxiliary lamp 6 remains on during the starting interval. When discharge lamp 1 reaches substantially normal operation, i.e., full illumination level, the voltage supply to the discharge lamp 1 and control circuit is at intermediate level, and under these conditions, whereas relay 13 is not actuated so that contacts 13a remain closed, relay 10 is actuated by this intermediate voltage and opens contacts 10a, turning off auxiliary lamp 6. When discharge lamp 1 is extinguished for any reason and the current supply is on, the open circuit voltage across 1 is relatively high. Under these conditions, relay 13 is actuated, opening its contacts 13a so that relay coil 10 is de-energized, closing its contacts 10a and turning on auxiliary 6. The latter lamp remains on until discharge lamp 1 is re-started and reaches substantially its normal operating voltage, as described above.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. Lighting systems comprising, in combination, voltage supply means, electrical ballast means connected to said voltage supply means, a gaseous discharge lamp connected to said ballast means for energization by said voltage supply means, said gaseous discharge lamp having a low voltage during its starting period, an intermediate voltage during its normal operation period, and a high voltage during its non-operating period, said gaseous discharge lamp being of high breakdown-potential type requiring an ignition voltage in the kilovolt range, ignition means electrically connected to said gaseous discharge lamp for producing such kilovolt ignition voltage thereon, an auxiliary lamp serving as a stand-by lamp for said gaseous discharge lamp, means for connecting said auxiliary lamp to a source of electrical current, control means selectively responsive to said low, intermediate, and high voltages for turning on said auxiliary lamp during said high voltage non-operating and low voltage starting periods of said gaseous discharge lamp and for turning off said auxiliary lamp during said intermediate voltage normal operation period of said gaseous discharge lamp, said control means comprising first and second relays, said first relay having a first coil connected across said gaseous discharge lamp and normally closed first switch contacts connected in series with said auxiliary lamp, said second relay having a second coil connected in parallel with said first coil and normally closed second switch contacts connected in series with said first coil, said first coil operating during said intermediate voltage period to open said first switch contacts for turning off said auxiliary lamp, said second coil operating during said high voltage period to open said second switch contacts for turning on said auxiliary lamp, both said first and second coils being non-responsive to said low voltage for maintaining said auxiliary lamp on during said starting period, and protective means connected to said control means for protecting the same against said kilovolt ignition voltage produced by said ignition means, said protective means comprising by-pass capacitor means connected across said second coil.

2. A lighting system as defined in claim 1, and second by-pass capacitor means connected across said first coil for protecting the same against said ignition voltage pulses.

3. A lighting system as defined in claim 2, including first resistance means in series with said first coil and said second switch contacts, and second resistance means in series with said second coil, said first resistance means having a lower resistance than said second resistance means.

* * * * *

UNITED STATES PATENT OFFICE
CERTIFICATE OF CORRECTION

Patent No. 3,737,719         Dated June 5, 1973

Inventor(s) Clair A. Nodurft

It is certified that error appears in the above-identified patent and that said Letters Patent are hereby corrected as shown below:

Col. 5, line 30, after "auxiliary" insert - lamp -

Col. 5, Claim 1, line 55, change "systems" to - system -

Signed and sealed this 19th day of March 1974.

(SEAL)
Attest:

EDWARD M. FLETCHER, JR.
Attesting Officer

C. MARSHALL DANN
Commissioner of Patents